US012268297B2

(12) United States Patent
Hanley et al.

(10) Patent No.: US 12,268,297 B2
(45) Date of Patent: *Apr. 8, 2025

(54) SHELVING SYSTEMS

(71) Applicant: Dejana Truck and Utility Equipment Co., Inc., Kings Park, NY (US)

(72) Inventors: Charles L. Hanley, Woonsocket, RI (US); Andrew DeJana, Kings Park, NY (US)

(73) Assignee: Dejana Truck and Utility Equipment Co., Inc., Kings Park, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/499,517

(22) Filed: Nov. 1, 2023

(65) Prior Publication Data
US 2024/0057765 A1    Feb. 22, 2024

Related U.S. Application Data

(63) Continuation of application No. 17/846,691, filed on Jun. 22, 2022, now Pat. No. 11,969,085, which is a
(Continued)

(51) Int. Cl.
A47B 46/00 (2006.01)
A47B 88/50 (2017.01)
A47B 96/02 (2006.01)
A47B 96/06 (2006.01)
B60P 3/00 (2006.01)
(Continued)

(52) U.S. Cl.
CPC ............ *A47B 46/005* (2013.01); *A47B 88/50* (2017.01); *A47B 96/028* (2013.01); *A47B 96/067* (2013.01); *B60P 3/007* (2013.01); *A47B 46/00* (2013.01); *A47B 88/40* (2017.01);
(Continued)

(58) Field of Classification Search
CPC ....... A47B 46/005; A47B 46/00; A47B 88/00; A47B 2095/024; A47B 88/50; A47B 96/028; A47B 96/067; A47B 88/43; A47B 88/40; A47B 2210/0016; A47B 2210/0059; A47B 95/02; A47B 96/07; H05K 7/1411;
(Continued)

(56) References Cited

U.S. PATENT DOCUMENTS

RE40,267 E * 4/2008 Mehmen ................. E05B 65/46
                                                        292/128
10,362,870 B1   7/2019 Smith .................. A47B 88/407
(Continued)

*Primary Examiner* — Janet M Wilkens
(74) *Attorney, Agent, or Firm* — Sorell, Lenna & Schmidt, LLP

(57) ABSTRACT

A shelving system includes first and second side members. A cross member is coupled to the side members. A guide member is coupled to the cross member such that the guide member is movable relative to the cross member. A container including a rail is coupled to the guide member. The rail includes a first locking element and a second locking element that is connected to the first locking element. The container includes a handle having a third locking element that engages the first locking element. The locking elements are configured to move the container between a first orientation in which the container is provisionally fixed to the guide member and a second orientation in which the container can translate relative to the guide member.

16 Claims, 14 Drawing Sheets

Related U.S. Application Data continuation of application No. 17/226,907, filed on Apr. 9, 2021, now Pat. No. 11,375,806, which is a continuation of application No. 16/822,491, filed on Mar. 18, 2020, now Pat. No. 11,000,123, which is a continuation of application No. 16/420,793, filed on May 23, 2019, now Pat. No. 10,610,012, which is a continuation of application No. 16/152,924, filed on Oct. 5, 2018, now Pat. No. 10,334,944, which is a continuation of application No. 15/649,991, filed on Jul. 14, 2017, now Pat. No. 10,172,452.

(60) Provisional application No. 62/362,375, filed on Jul. 14, 2016.

(51) Int. Cl.
   *A47B 88/40* (2017.01)
   *A47B 88/43* (2017.01)

(52) U.S. Cl.
   CPC ....... *A47B 88/43* (2017.01); *A47B 2210/0016* (2013.01); *A47B 2210/0059* (2013.01); *B60P 3/00* (2013.01)

(58) Field of Classification Search
   CPC ... B60P 3/007; B60P 3/00; B60R 7/08; B60R 7/04; B60R 11/00; B60R 2011/0003
   USPC .. 312/333, 334.7, 334.44, 286, 332.1, 330.1
   See application file for complete search history.

(56) References Cited

U.S. PATENT DOCUMENTS

| | | | |
|---|---|---|---|
| 10,443,271 B1 | 10/2019 | Rose | E05B 65/46 |
| 10,703,292 B2 | 7/2020 | Hanley | A47B 96/07 |
| 11,357,326 B1 | 6/2022 | Hanley | E05B 65/46 |
| 11,608,006 B2 | 3/2023 | Hanley | B60P 3/007 |
| 11,969,085 B2 * | 4/2024 | Hanley | A47B 96/028 |
| 2006/0103278 A1 * | 5/2006 | Bousquet | E05B 65/46 |
| | | | 312/332.1 |
| 2011/0121701 A1 * | 5/2011 | Chang | E05B 7/00 |
| | | | 312/332.1 |
| 2011/0169389 A1 * | 7/2011 | Jeffries | A47B 95/02 |
| | | | 292/336.3 |

* cited by examiner

SHELVING SYSTEMS

CROSS-REFERENCE TO RELATED APPLICATIONS

This application is a continuation of U.S. application Ser. No. 17/846,691, filed Jun. 22, 2022, which is a continuation of U.S. application Ser. No. 17/226,907, filed Apr. 9, 2021, now U.S. Pat. No. 11,375,806, which is a continuation of U.S. application Ser. No. 16/822,491, filed Mar. 18, 2020, now U.S. Pat. No. 11,000,123, which is a continuation of U.S. application Ser. No. 16/420,793, filed May 23, 2019, now U.S. Pat. No. 10,610,012, which is a continuation of U.S. application Ser. No. 16/152,924, filed Oct. 5, 2018, now U.S. Pat. No. 10,334,944, which is a continuation of U.S. application Ser. No. 15/649,991, filed Jul. 14, 2017, now U.S. Pat. No. 10,172,452, which claims priority to U.S. Application Ser. No. 62/362,375, filed Jul. 14, 2016. These applications are expressly incorporated herein by reference, in their entireties.

TECHNICAL FIELD

The present disclosure generally relates to shelves used to store items such as, for example, parcels and/or packages, and more particularly to a shelving system for temporarily storing items, wherein trays, drawers or containers of the system can be opened by pushing a handle up or down.

BACKGROUND

Delivery and/or service vehicles such as, for example, trucks, vans and cars may include an assembly having trays positioned on one or more racks located in an interior of the delivery or service vehicle. Items such as, for example, tools, parcels and/or packages are stored on the trays temporarily while the vehicle is being driven to a selected destination, such as, for example, the home or office of a client or a loading dock or storefront of recipient. A driver of the vehicle or other personnel may remove the item or items from the tray once he or she arrives at the selected destination by accessing the item or items through one or more doors of the vehicle, such as, for example, rear doors of a van or truck. Some vehicles include trays that slide relative to the rack to facilitate accessing the item or items by the driver of the vehicle or other personnel. That is, once one or more doors of the vehicle are opened, the driver or other personnel may slide the trays relative to the rack such that the item or items are conveniently located outside of the interior of the vehicle.

Spacing between adjacent trays is typically pre-determined according to the configuration of the rack, which typically includes equally spaced slot or other means configured to engage a tray such that the trays are equally spaced up and down the rack. Spacing between adjacent trays may therefore be inadequate to accommodate large items or, alternatively, may be greater than necessary when relatively small items are positioned on one of the trays. While some conventional rack and tray assemblies included in vehicles may increase the spacing between adjacent trays by removing one or more trays to accommodate large items, such assemblies lack a means to reduce the spacing between adjacent trays or increase the spacing between adjacent trays without removing one or more of the trays. As a result, the spacing between adjacent trays is often pre-determined according to the design of the rack, rather than the size and shape of the item or items placed on the tray. That is, spacing between adjacent trays cannot be modified according to characteristics of the items placed on the trays, but is instead determined by the configuration of the rack and tray.

Furthermore, in vehicles that include trays that slide relative to the rack, the trays tend to slide at undesired times such as, for example, when the delivery vehicle makes a sharp turn and/or when the vehicle comes to an abrupt stop, which causes the item or items positioned on the tray to move relative to the tray and/or fall off the tray and onto the floor of the vehicle, potentially damaging the item or items. While some rack and tray assemblies used in vehicles include a locking mechanism to prevent the trays for sliding relative to the rack, the locking mechanisms used encompass only a small portion of the tray, thus making accessing the locking mechanism difficult and/or may require two hands to operate. For example, conventional locking mechanisms include a handle having a thumb release on one side of the handle. In order to lock and/or unlock the tray from the rack, the driver of the vehicle or other personnel is required to apply the thumb release, typically by pressing the thumb release down. Due to the small size and remote location of the thumb release, accessing and/or pressing the thumb release is often difficult, especially when the driver or other personnel is carrying other items.

Still further, trays of conventional rack and tray assemblies used in vehicles often include handles that can only be opened by pushing or pulling a handle in one direction. This makes it difficult to open a tray when holding other items. For example, it may be difficult to open a tray by lifting or pulling a handle upwardly if the driver or other personnel is carrying other items. This disclosure describes improvements over these prior art technologies.

SUMMARY

In one embodiment, a shelving system is provided. The shelving system includes first and second side members. A cross member is coupled to the side members. A guide member is coupled to the cross member such that the guide member is movable relative to the cross member. A container including a rail is coupled to the guide member. The rail includes a first locking element and a second locking element that is connected to the first locking element. The container includes a handle having a third locking element that engages the first locking element. The locking elements are configured to move the container between a first orientation in which the container is provisionally fixed to the guide member and a second orientation in which the container can translate relative to the guide member.

In one embodiment, the shelving system comprises first and second side members. A cross member is coupled to the side members. A guide member is coupled to the cross member such that the guide member is movable relative to the cross member. A container including a rail is coupled to the guide member. The rail includes a first locking element and a second locking element that engages the first locking element. The container includes a handle comprising a first portion, a second portion and a third locking element that engages the first locking element. Moving the second portion relative to the first portion in an upward direction or a downward direction moves the locking elements between a first orientation in which the container is provisionally fixed to the guide member and a second orientation in which the container can translate relative to the guide member.

In one embodiment, the shelving system comprises first and second side members that each include a channel. A first slide is slidably disposed in the channel of the first member.

A second slide is slidably disposed in the channel of the second member. A cross member extends between and connects the slides. A guide member is movably disposed in a channel of the cross member. A rail of a container is disposed in a channel of the guide member. The rail includes a first locking element and a second locking element that engages the first locking element. The container includes a handle comprising a first portion, a second portion and a third locking element that engages the first locking element. Moving the second portion relative to the first portion in an upward direction or a downward direction moves the locking elements between a first orientation in which the container is provisionally fixed to the guide member and a second orientation in which the container can translate relative to the guide member.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

Figure 1:
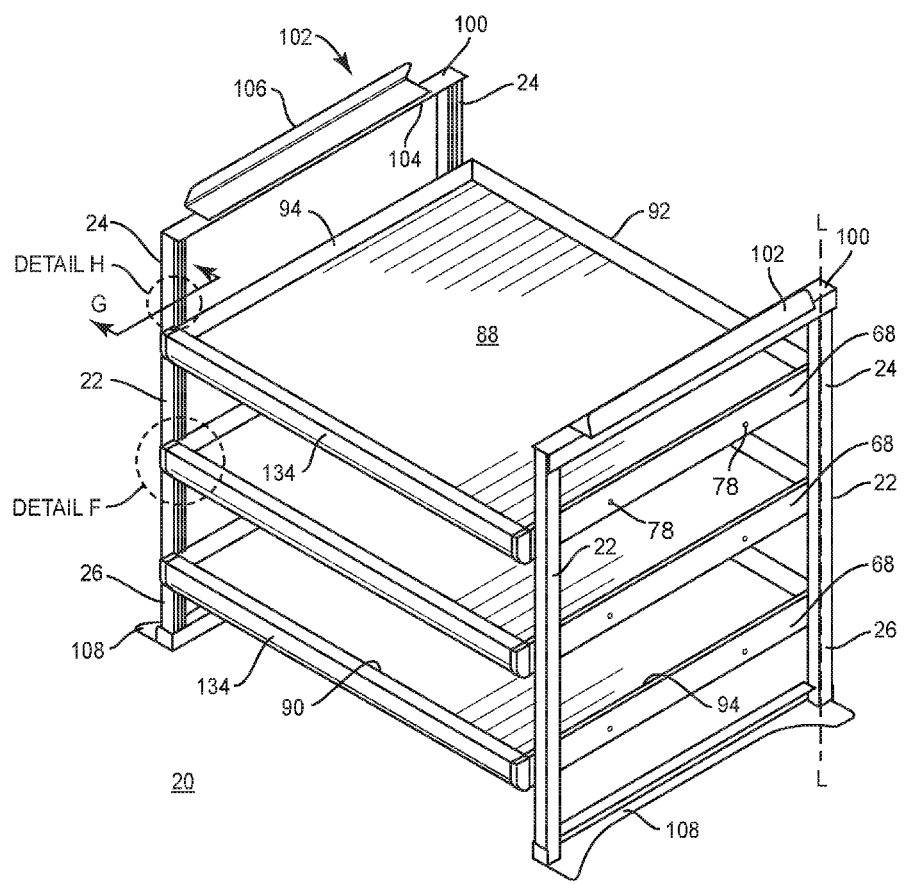
FIG. 1 is a perspective view of one embodiment of a shelving system in accordance with the principles of the present disclosure.

The exemplary embodiments of a shelving system and related methods of use are discussed in terms of devices for the storage of items during transport. The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a shelving system, related components and methods of employing the shelving system in accordance with the principles of the present disclosure. Alternate embodiments are also disclosed. Reference will now be made in detail to the exemplary embodiments of the present disclosure, which are illustrated in the accompanying figures. Turning to FIGS. 1-17, there are illustrated components of a shelving system 20.

In some embodiments, system 20 is configured for mounting in a vehicle, such as, for example, a delivery or service vehicle, such as, for example, a van or truck. In some embodiments, system 20 is mounted in the vehicle such that system 20 is accessible through rear doors of the vehicle, but is not readily accessible through side doors, or any other doors of the vehicle. In such embodiments, system 20 is positioned such that system 20 may move from a closed position to an open position when the rear doors of the vehicle open, but is prevented from moving from the closed position to the open position when the rear doors are closed, as will be described. In some embodiments, system 20 is mounted in the vehicle such that system 20 is accessible through one or more side door of the vehicle, but is not readily accessible through rear doors, or any other doors of the vehicle. In such embodiments, system 20 is positioned such that system 20 may move from the closed position to the open position when the side door of the vehicle is open, but is prevented from moving from the closed position to the open position when the side door is closed, as will be described. In some embodiments, system 20 includes a plurality of shelving units, wherein one unit is mounted in the vehicle such that it is accessible through one or more side doors on a first side of the vehicle and another unit is mounted in the vehicle such that it is accessible through one or more side doors on an opposite second side of the vehicle. In some embodiments, system 20 includes the vehicle.

The components of shelving system 20 can be fabricated from materials including metals, polymers and/or composites, depending on the particular application. For example, the components of system 20, individually or collectively, can be fabricated from materials such as aluminum, steel, iron, stainless steel, titanium, titanium alloys, cobalt-chrome, stainless steel alloys, semi-rigid and rigid materials, plastics, elastomers, rubbers and/or rigid polymers. Various components of system 20 may have material composites, including the above materials, to achieve various desired characteristics such as strength, rigidity, elasticity, performance and durability. The components of system 20, individually or collectively, may also be fabricated from a heterogeneous material such as a combination of two or more of the above-described materials. The components of system 20 can be extruded, molded, injection molded, cast, pressed and/or machined. The components of system 20 may be monolithically formed, integrally connected or include fastening elements and/or instruments, as described herein.

Figure 2:
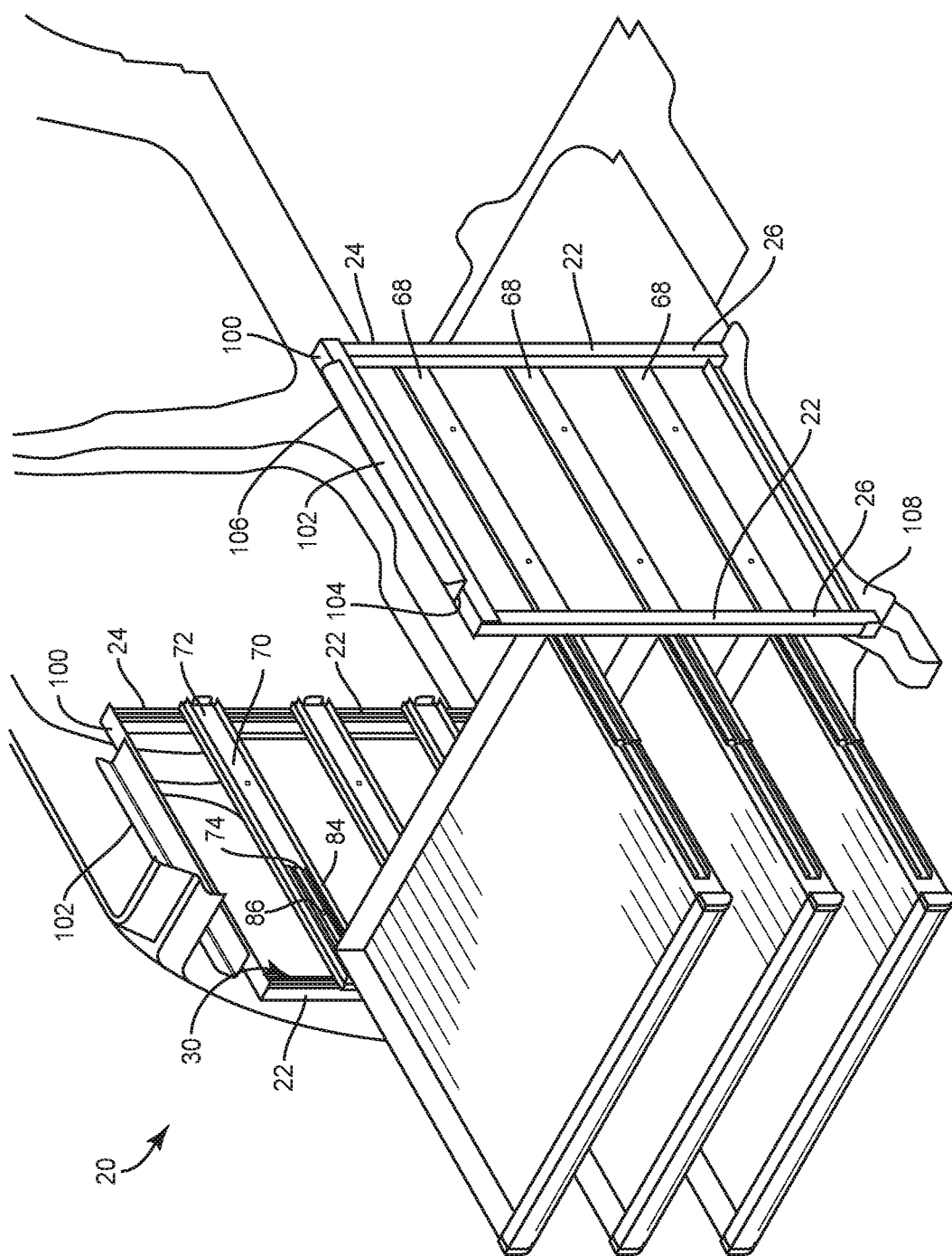
FIG. 2 is a perspective view of the shelving system shown in FIG. 1 mounted in a vehicle.
Figure 3:
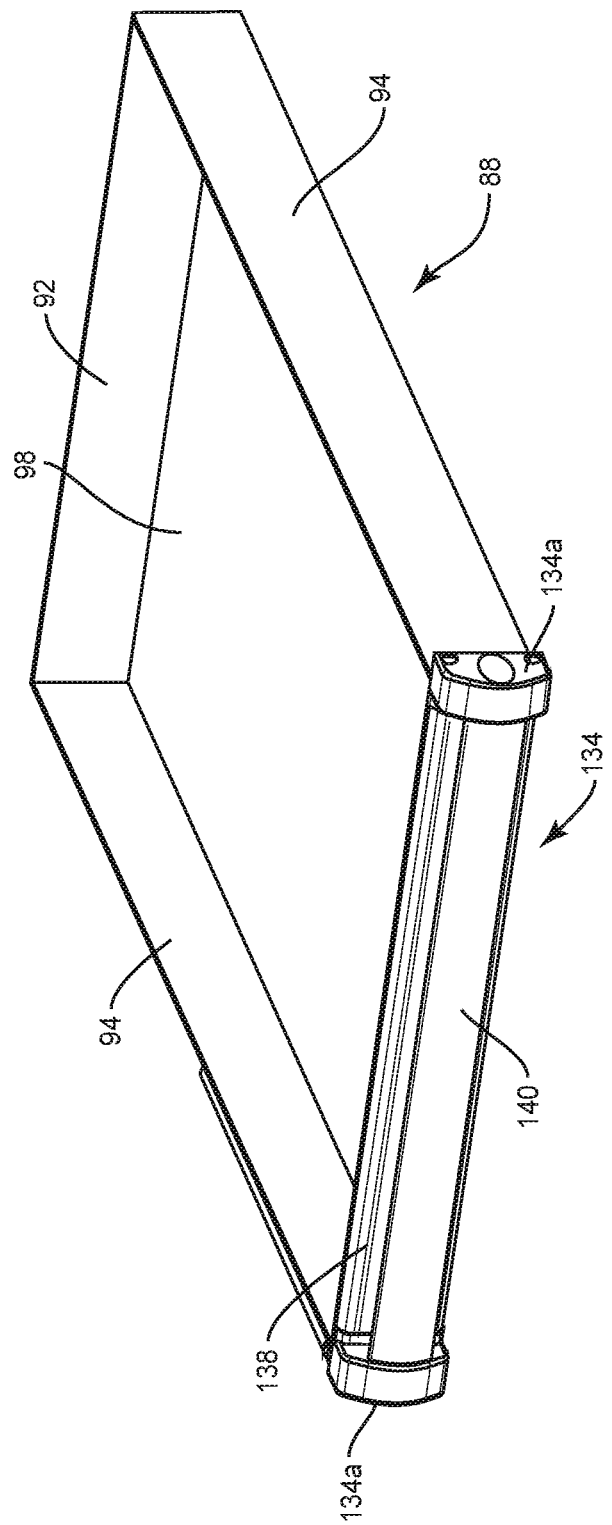
FIG. 3 is a perspective view of a component of the system shown in FIG. 1, with some parts removed.
Figure 15:
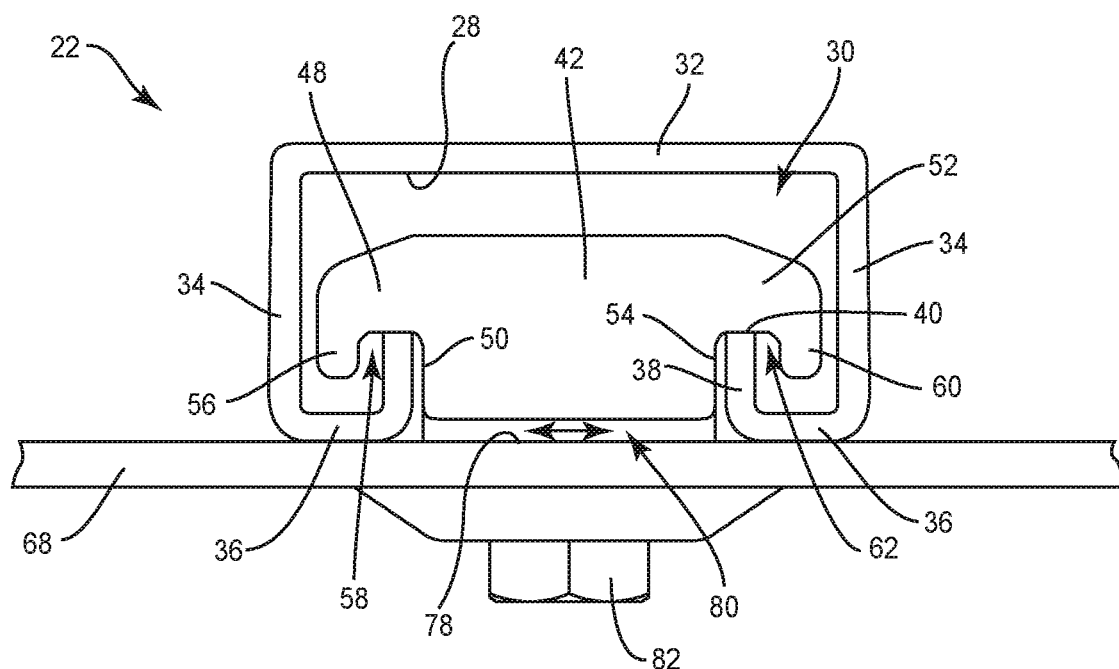
FIG. 15 is a breakaway top, cross sectional view of components of the system shown in FIG. 1 along lines G-G at Detail H.

System 20 includes a first pair of side members 22 opposite a second pair of side members 22. Side members 22 each extend along a longitudinal axis L between a first end 24 and a second end 26. Side members 22 have a length defined by the distance between ends 24, 26. Side members 22 have a uniform width or diameter along the entire length of each side member 22. Side members 22 each include an inner surface 28 defining a first channel 30, as shown in FIGS. 2 and 15, for example. First channels 30 each extend the entire length of each side member 22. Inner surfaces 28 of the first pair of side members 22 face inner surfaces of the second pair of side members 22. In some embodiments, side members 22 and/or first channel 30 may have various cross section configurations, such as, for example, oval, oblong, triangular, rectangular, square, polygonal, irregular, uniform, non-uniform, variable, tubular and/or tapered, depending upon the requirements of a particular application. In some embodiments, each first channel 30 is capped on either ends thereof such that each first channel 30 has a length that is less than the length of a respective side member 22 to prevent a component, such as, for example, a slide 42 (FIG. 13) disposed in first channel 30 from moving out of first channel 30, a discussed herein.

Side members 22 each include a planar first wall 32 extending between parallel planar side walls 34, as shown in FIG. 15, for example. First walls 32 of the first pair of side members 22 are aligned with one another and first walls 32 of the second pair of side members 22 are aligned with one another. Side walls 34 each include an inwardly facing end wall 36 that extends perpendicular to side walls 34. End walls 36 are parallel to first wall 32 and each include an extension 38 extending toward first wall 32. Extensions 38 each include a planar end surface 40 extending parallel to first wall 32 configured to engage a portion of slide 42, as discussed herein. In some embodiments, all or only a portion of first wall 32, side walls 34, extensions 38 and/or end surfaces 40 may be variously configured and dimensioned, such as, for example, planar, concave, polygonal, irregular, uniform, non-uniform, staggered, tapered, consistent or variable, depending on the requirements of a particular application. In some embodiments, first wall 32, side walls 34, extensions 38 and/or end surfaces 40 may be disposed at alternate orientations, relative to one another and/or longitudinal axis L, such as, for example, parallel, transverse, perpendicular and/or other angular orientations such as acute or obtuse, co-axial and/or may be offset or staggered, depending upon the requirements of a particular application.

At least one slide 42 (FIG. 13) is movably disposed in each first channel 30, as shown in FIG. 15, for example. Slides 42 are configured to adjust the position of a tray or a container, such as, for example a container 88 along the length of side members 22. For example, four slides 42 are coupled to a given container 88 such that container 88 can be moved up and down along side members 22. In embodiments wherein system includes multiple containers 88, coupling slides 42 to containers 88 allows containers 88 to be selectively spaced apart from one another. For example, when items are placed upon or in containers 88, the items may have different sizes thus requiring that containers 88 be spaced apart from one another to allow sufficient space between containers 88 for the items upon or in containers 88. As such, when larger items are placed upon or in a given container 88, that container 88 may need to be moved up or down along side members 88 to allow more space between that container 88 and one or more adjacent container 88. Accordingly, slides 42 may be used to move that container 88 along side members 88 to accommodate more space between that container 88 and the adjacent container(s) 88, as discussed herein.

It is envisioned that system 20 may include one or a plurality of slides 42 disposed in each first channel 30. In the embodiment shown in FIGS. 1 and 2, each first channel 30 includes three slides 42 movably disposed therein. It is envisioned that each of side members 22 includes the same number of slides 42 positioned therein. That is, each side member 22 that makes up the first pair of side members 22 includes the same number of slides as each side member 22 that makes up the second pair of side members 22. As would be apparent to one of ordinary skill in the art, the number of slides 42 in system 20 will depend upon the number of containers 88 used in system 20. Four slides 42 are used for each container 88. As such, when system 20 includes only one container 88, four slides 42 will be used; when system 20 includes two containers 88, eight slides 42 will be used; when system includes three containers 88, twelve slides 42 will be used; when system 20 includes four containers 88, sixteen slides 42 will be used, etc.

Figure 13:
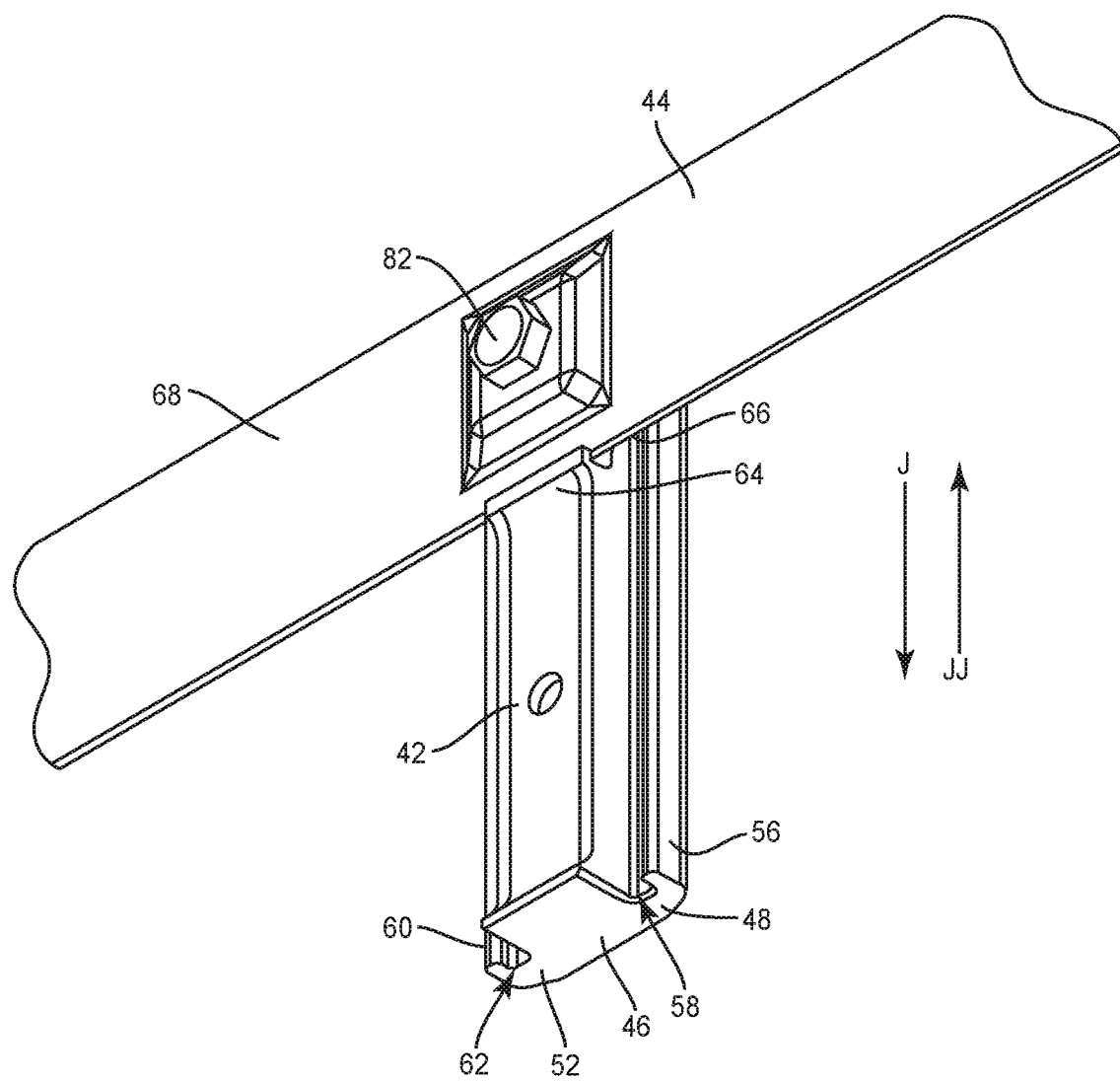
FIG. 13 is a breakaway, perspective view of components of the system shown in FIG. 1 at detail F.

Slides 42 each include an elongated body extending along longitudinal axis L between a first end 44 and a second end 46, as best shown in FIG. 13. The body of slide 42 includes a first arm 48 extending perpendicular to longitudinal axis L from a first side surface 50 of the body and a second arm 52 extending perpendicular to longitudinal axis L from an opposite second side surface 54 of the body, as best shown in FIG. 15. First arm 48 includes a first wing 56 extending perpendicular to the first arm 48 and defining a first cavity 58. Second arm 52 includes a second wing 60 extending perpendicular to second arm 52 and defining a second cavity 62. First cavity 38 is spaced apart from second cavity 62 by the body of slide 42. One extension 38 of a respective side member 22 is disposed in first cavity 58 and one extension 38 of the respective side member 22 is disposed in second cavity 62 such that slide 42 is movable relative to side member 22 within first channel 30. One end surface 40 is configured to engage first arm 48 and one end surface 40 is configured to engage second arm 52. Slide 42 has a maximum width that is less than a maximum width of first channel 30 such that outer surfaces of first wing 56 and second wing 60 are spaced apart from inner surface 28 when slide 42 is disposed in first channel 30 to allow slide 42 to translate within first channel 30 with minimal resistance. In some embodiments, first arm 48, first side surface 50, second arm 52, second side surface 54, first wing 56, first cavity, second wing 60 and/or second cavity 62 may be disposed at alternate orientations, relative to one another and/or longitudinal axis L, such as, for example, parallel, transverse, perpendicular and/or other angular orientations such as acute or obtuse, co-axial and/or may be offset or staggered, depending upon the requirements of a particular application.

Slides 42 each include a projection 64 extending perpendicular to axis L configured to engage a bottom surface 66 of a cross member 68, as best shown in FIG. 13, to prevent cross member 68 from translating axially relative to slide 42 in the direction shown by arrow J, while allowing cross member 68 to translate axially relative to slide 42 in the direction shown by arrow JJ until cross member 68 is fixed to slide 42, as discussed herein. One cross member 68 extends between and connects each of the slides 42 positioned in first channels 30 of the first pair of side members 22 and one cross member 68 extends between and connects each of the slides 42 positioned in first channels 30 of the second pair of side members 22. In some embodiments, a plurality of cross members 68 extend between and connect slides 42 positioned in first channels 30 of the first pair of side members and an equal number of cross members 68 extend between and connect slides 42 positioned in first channels 30 of the second pair of side members such that the cross members 68 connecting the first pair of side members 22 are parallel aligned with the cross members 68 connecting the second pair of side members 22.

As with slides 42, the number of cross members 68 included in system 20 will depend upon the number of containers 88 used in system 20. One cross member 68 is coupled to two slides 42. As such, two cross members 68 are used for each container 88. As such, when system 20 includes only one container 88, two cross members 68 will be used; when system 20 includes two containers 88, four cross members 68 will be used; when system includes three containers 88, six cross members 68 will be used; when system 20 includes four containers 88, eight cross members 68 will be used, etc.

Figure 14:
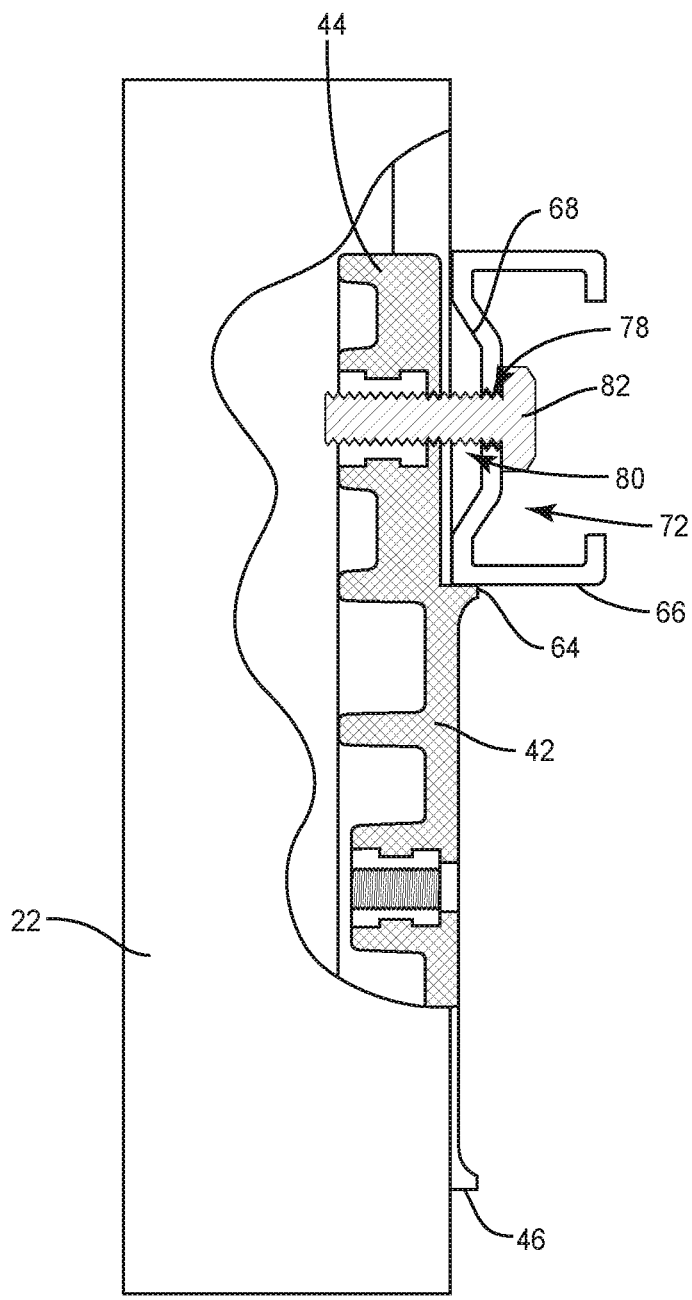
FIG. 14 is a side view, in partial cross section, of components of the system shown in FIG. 1.

Cross members 68 each include an inner surface 70 defining a second channel 72, as shown in FIG. 2, for example. Channels 72 are each configured for movable disposal of a guide member 74, as discussed herein. Cross members 68 each include spaced apart threaded openings 78, each of the openings 78 being aligned with a threaded aperture 80 in one of the slides 42, as shown in FIG. 14, for example. A threaded fastener 82 extends through a respective opening 78 and a respective aperture 80 to fix cross member 68 with slides 42. Fasteners 82 are moveable between a first position in which an outer surface of cross member 68 is spaced apart from outer surfaces of side members 22 and slides 42 can translate axially within first channels 30 and a second position in which the outer surface of cross member 68 engages the outer surfaces of side members 22 and slides 42 are fixed relative to side members 22. When fasteners 82 are in the second position, end walls 36 engage the outer surface of cross member 68 and end surfaces 40 engage arms 48, 52, as best shown in FIG. 15. When fasteners 82 are in the second position, the body of slide 42 is spaced apart from cross member 68. That is, the only portion of each slide 42 that contacts a respective side member 22 and/or cross member 68 is first arm 48 and second arm 52. This configuration allows fasteners 82 to move between the first and second positions by unthreading or threading a respective fastener 82 through a respective opening 78 and a respective aperture 80 only slightly. That is, fastener 82 need only be rotated relative to slide 42 and/or cross member 68 one or a few turns to move fastener 82 from between the first and second positions. When fasteners 82 are in the first position, slides 42 can translate within first channels 30 to adjust the position of slides 42 relative to side members 22. That is, slides 42 can be moved up or down along the length of side members 22 when fasteners 82 are in the first position to adjust the positioning of cross members 68 and containers 88, as discussed herein. Fasteners 82 are then moved from the first position to the second position to fix the position of slides 42 relative to side members 22. Fixing the position of slides 42 relative to side members 22 prevents cross members 68 attached to the fixed slides 42 from moving up and down along the length of side members 22 and thus prevents containers 88 that are coupled to the fixed slides 42 by cross members 68 from moving up and down along the length of side members 22.

In some embodiments, side members 22 each include indicia on an outer surface thereof, such as, for example, calibrated lines to measure distances. Such indicia may be used to ensure that four slides 42, each disposed in a first channel 30 of one of the side members 22 that make up the first and second pairs of side members 22 may each be aligned to define a first level. It is envisioned that the indicia may also be used to align other levels of slides 42 before or after aligning the first level. This ensures that cross members 68 coupled to the first and second pairs of side members 22 will be parallel to one another and hence that container 88 will be perpendicular to axis L.

Figure 10:
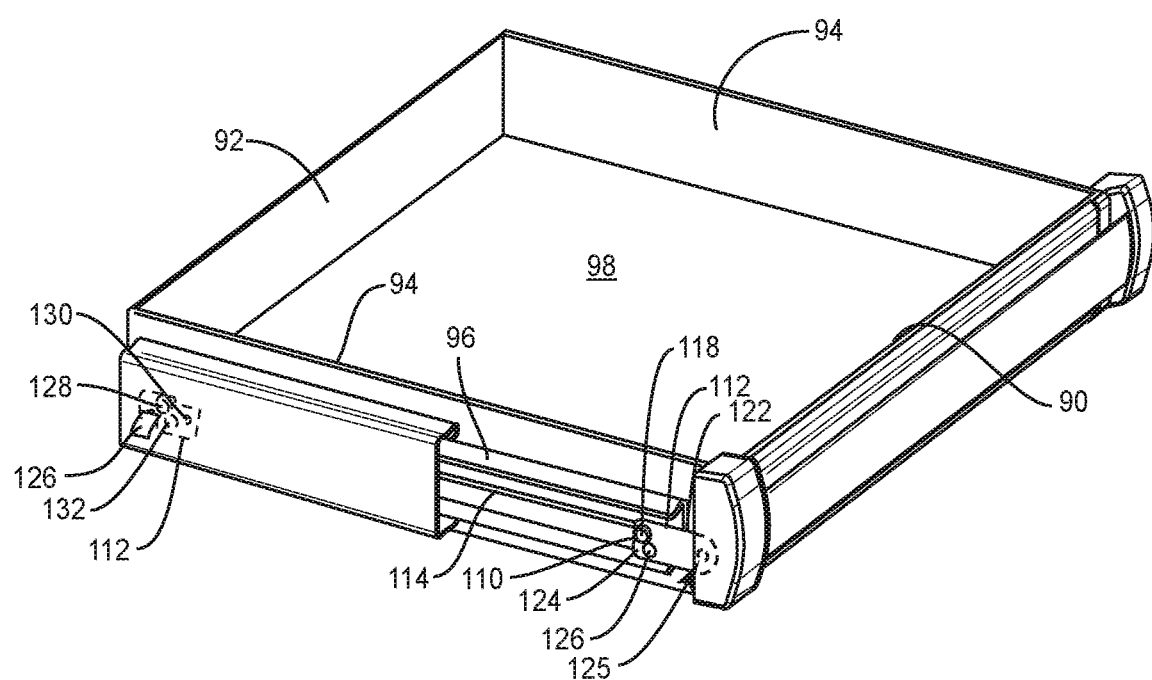
FIG. 10 is a perspective view of a component of the system shown in FIG. 1, with some parts removed.
Figure 11:
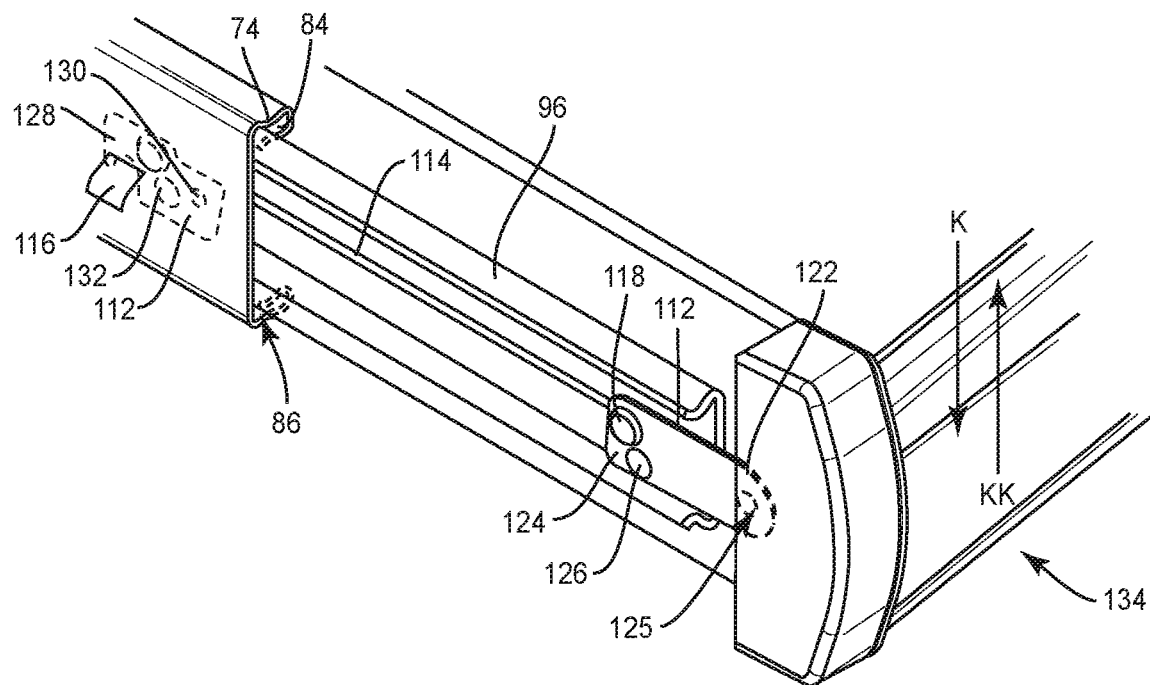
FIG. 11 is a perspective view of components of the system shown in FIG. 1, with components of the system in a first position.
Figure 12:
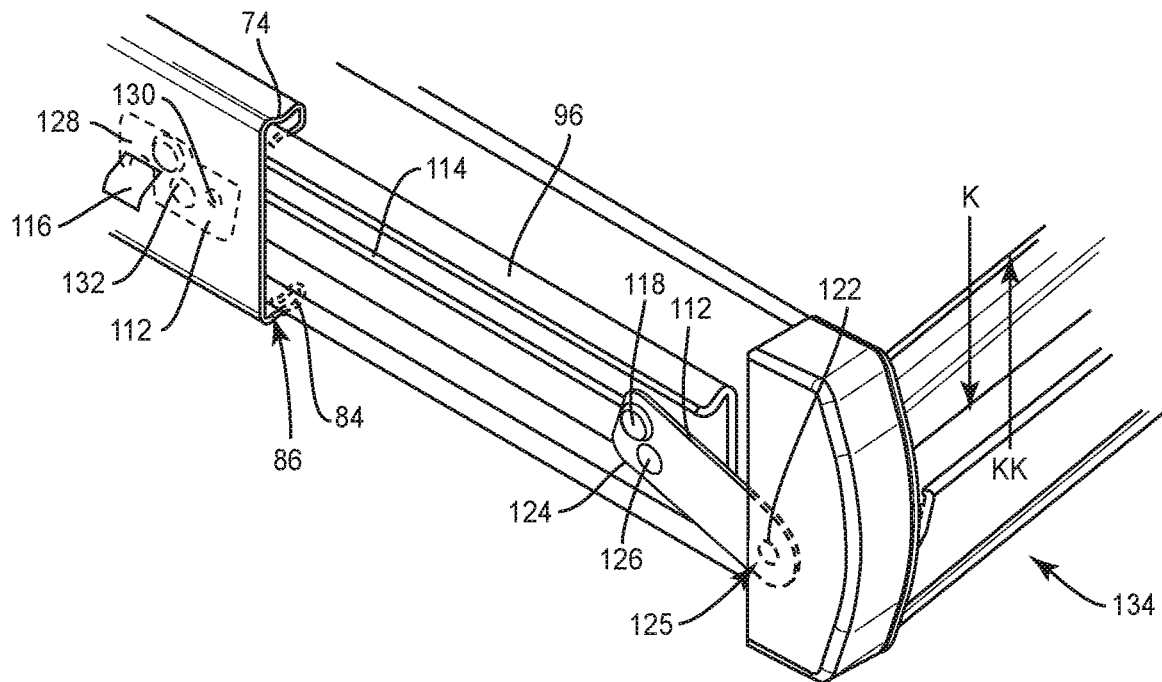
FIG. 12 is a perspective view of components of the system shown in FIG. 1, with components of the system in a second position.

Each guide member 74 is movably disposed in a second channel 72 of one of cross members 68 and includes an inner surface 84 defining a third channel 86, as shown in FIGS. 2, 11 and 12, for example. Containers 88 each include a first wall 90 and a second wall 92 extending parallel to first wall 90, as shown in FIG. 10, for example. Container 88 includes a pair of spaced apart side walls 94 extending between first and second walls 90, 92. Outer surfaces of each side wall 94 include a rail 96. One rail 96 is shown in FIG. 10, for clarity. One rail 96 of one container 88 is movably disposed in a third channel 86 of a guide member 74 extending between the first pair of side members 22 and one rail 96 of the container 88 is movably disposed in a third channel 86 of an aligned guide member 74 extending between the second pair of side members 22. Container 88 includes a recessed tray 98 positioned between first and second walls 90, 92 and between the side walls 94. Tray 98 is maintained in a substantially horizontal orientation when container 88 translates within third channel 86 and guide member 74 translates within second channel 72. In some embodiments, tray 98 extends perpendicular to axis L when container 88 translates within third channel 86 and guide member 74 translates within second channel 72.

A first upper member 100 extends between and connects first ends 24 of the first pair of first members 22 and a second upper member 100 extends between and connects first ends 24 of the second pair of first members 22. Each upper member 100 includes a bracket 102 having a first surface 104 extending perpendicular to axis L and a second surface 106 disposed at an acute angle relative to first surface 104. In some embodiments, first surface 104 is connected to second surface 106 such that first surface 104 pivots relative to second surface 106 such that second surface 106 can be selectively positioned relative to first surface 104. That is, the angle between second surface 106 and first surface 104 can be adjusted to position second surface 106 such that second surface can be coupled to a wall of a vehicle, such as, for example, a side wall or ceiling of the vehicle.

In embodiments in which system 20 is configured for mounting in a vehicle such that system 20 is accessible through rear doors of the vehicle, second surface 106 includes one or more openings configured for disposal of a fastener such that the fastener extends through the opening in second surface 106 and into a side wall of the vehicle to fix system 20 relative to the vehicle. It is envisioned that the one or more openings extending through second surface 106 may include threads to facilitate engagement with a fastener. In some embodiments, upper member 100 may be configured to engage the ceiling of a vehicle using bracket 102 described above. In some embodiments, upper member 100 is configured to engage the ceiling of a vehicle and does not include a bracket. Rather, upper member 100 is a single plate that includes one or more openings extending parallel to axis L configured for disposal of a fastener such that the fastener extends through the opening in upper member 100 and into the ceiling of the vehicle to fix system 20 relative to the vehicle. In some embodiments, upper member 100 includes surface configurations to enhance fixation with the interior of the vehicle, such as, for example, rough, arcuate, undulating, porous, semi-porous, dimpled, polished and/or textured according to the requirements of a particular application.

A first lower member 108 extends between and connects second ends 26 of the first pair of first members 22 and a second lower member 108 extends between and connects ends 26 of the second pair of first members 22. Lower members 108 each include a first surface including an aperture extending parallel to axis L configured for disposal of a fastener such that the fastener extends through the aperture and into the floor of the vehicle to fix system 20 relative to the vehicle. In some embodiments, the aperture is threaded. It is envisioned that lower members 108 may each include one or a plurality of apertures. In some embodiments, the apertures are uniformly spaced apart from one another.

Rails 96 are parts of a frame and each include a first locking element 110 positioned adjacent first wall 90 and a second locking element 112 positioned adjacent second wall 92, as shown in FIG. 10, for example. Second locking element 112 is connected to first locking element 110 by a cable 114. An inner surface 84 of each guide member 74 includes at least one flange 116, as shown in FIGS. 11 and 12. Flange 116 is configured to engage second locking element 112 to fix container 88 relative to cross member 68 and/or guide member 74. That is, when second locking element 112 engages flange 116, rail 96 is prevented from moving within third channel 86 of guide member 74 to fix container 88 relative to guide member 75. When second locking element 112 disengages flange 116, rail 96 is able to translate within third channel 86 of guide member 74 to move container 88 relative to guide member 74 along a length of guide member 74. In some embodiments, system 20 includes a first flange 116 adjacent first wall 90 and a second flange 116 spaced apart from the first flange 116 adjacent second wall 92. In some embodiments, flange 116 extends at an acute angle relative to an axis defined by guide member 74.

In some embodiments, first locking element 110 includes a first knob 118 and second locking element 112 includes a second knob 120. Cable 114 engages first knob 118 and second knob 120 to connect first locking element 110 with second locking element 112. In some embodiments, cable 114 comprises a rigid material such that the distance between first knob 118 and second knob 120 is fixed. In some embodiments, a first end of cable 114 defines a hook that engages first knob 118 and a second end of cable 114 defines a hook that engages second knob 120, the hooks being oriented in opposite directions. That is, the hook that engages first knob 118 has an opening oriented in a direction that is opposite the direction in which the opening of the hook that engages second knob 120 is oriented. In some embodiments, cable 114 applies tension between first knob 118 and second knob 120.

A first end 122 of first locking element 110 is pivotable relative to a second end 124 of first locking element 110 about a pivot point 126 positioned between first knob 118 and first wall 90. First end 122 includes a hole 125 that extends through a thickness of first locking element 110. In some embodiments, pivot point 126 is closer to knob 118 than hole 125, as shown in FIG. 10. However, it is envisioned that pivot point 126 may be closer to hole 125 than knob 118 or that pivot point 126 can be equidistant between knob 118 and hole 125. A first end 128 of second locking element 112 pivots relative to a second end 130 of second locking element 112 about a pivot point 132 positioned between second knob 120 and first locking element 110.

First wall 90 includes a handle 134 including a third locking element 136 that engages first end 122 of first locking element 110. First wall 90 has a length extending between side walls 94, 94. Handle 134 extends between side walls 94, 94 such that handle 134 has a length that is equal to the length of first wall 90. Handle 134 is movable between a first position in which first end 128 of second locking element 112 engages flange 116 of guide member 74 and container 88 is fixed relative to guide member 74, as shown in FIG. 11, and a second position in which first end 128 of second locking element 112 is spaced apart from flange 116 and container 88 can translate relative to guide member 74, as shown in FIG. 12. That is, first end 128 of second locking element 112 is pivoted about pivot point 132 to move first end 128 of second locking element 112 in an upward direction, such as, for example, direction K shown in FIG. 11 to disengage first end 128 of second locking element 112 from flange 116 to allow rail 96 to move within third channel 86 of guide member 74.

Figure 5:
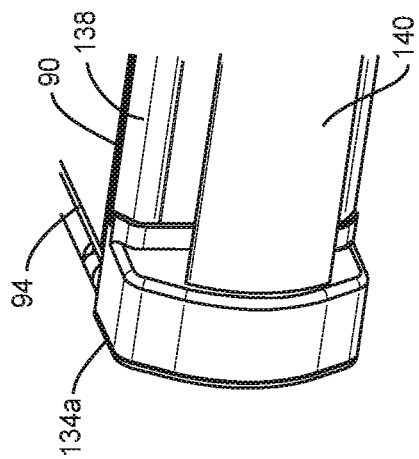
FIG. 5 is a close up, perspective view of a portion of the component shown in FIG. 3.
Figure 6:
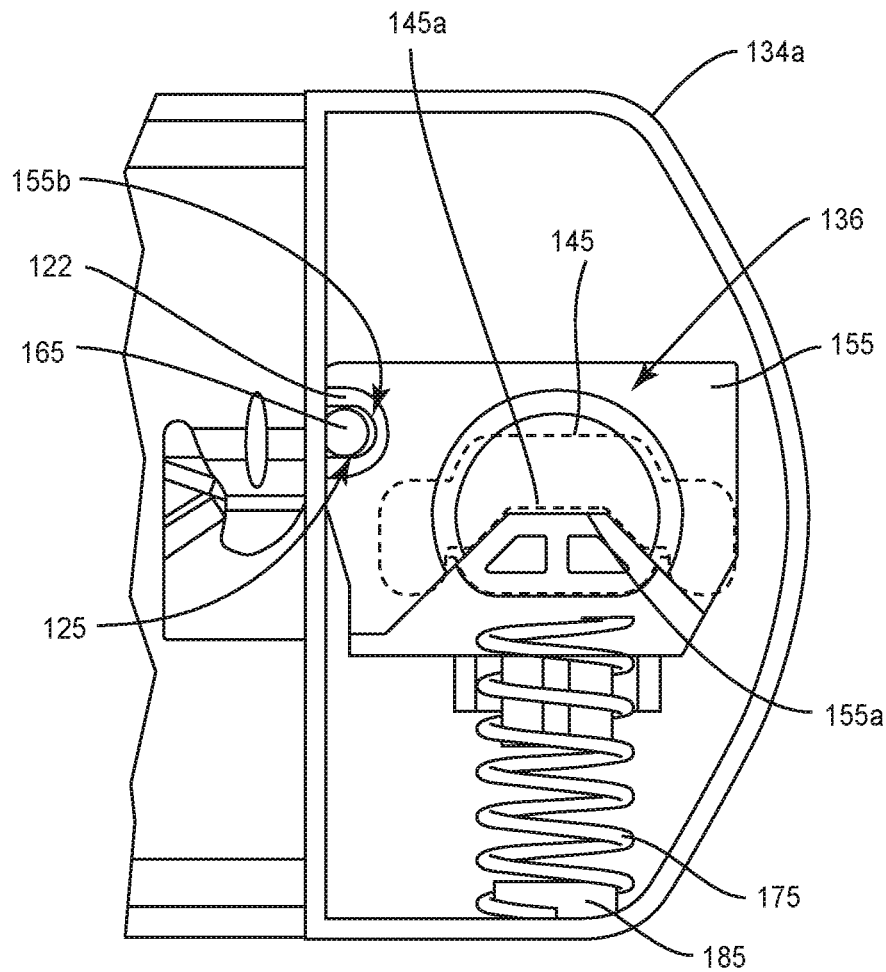
FIG. 6 is a side view, in part phantom, of a portion of the system shown in FIG. 1.
Figure 7:
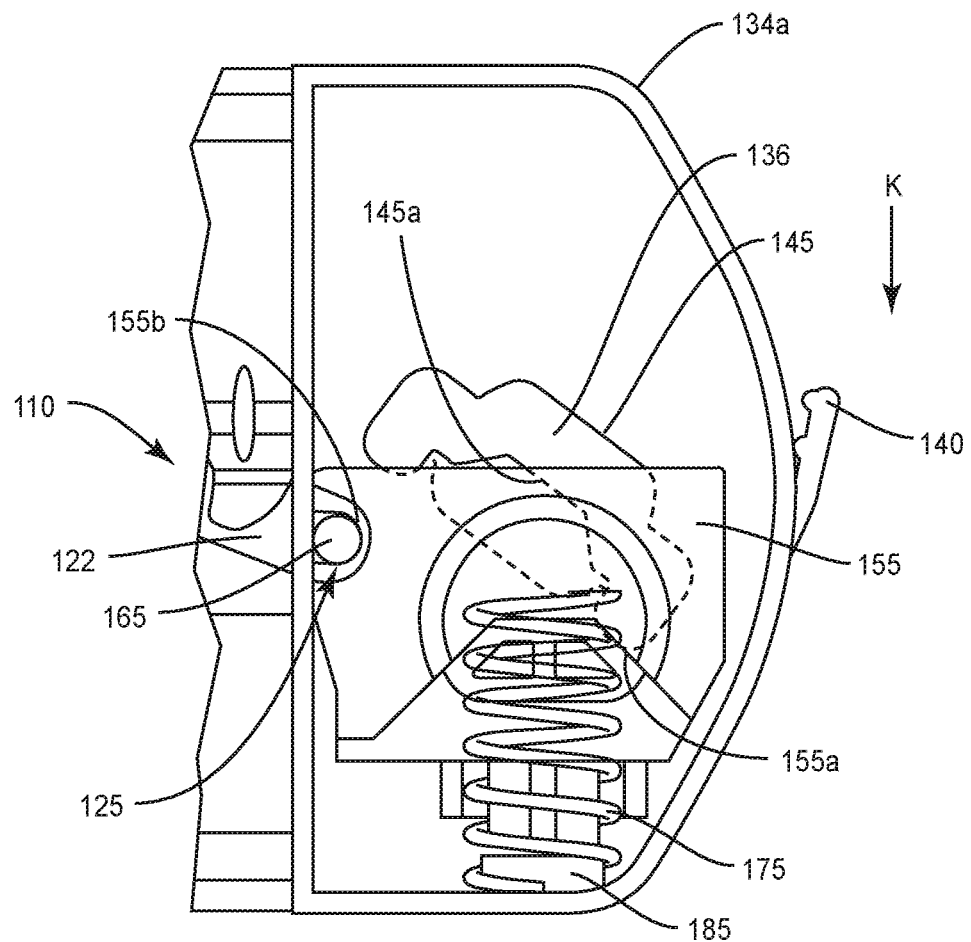
FIG. 7 is a side view, in part phantom, of a portion of the system shown in FIG. 1.
Figure 8:
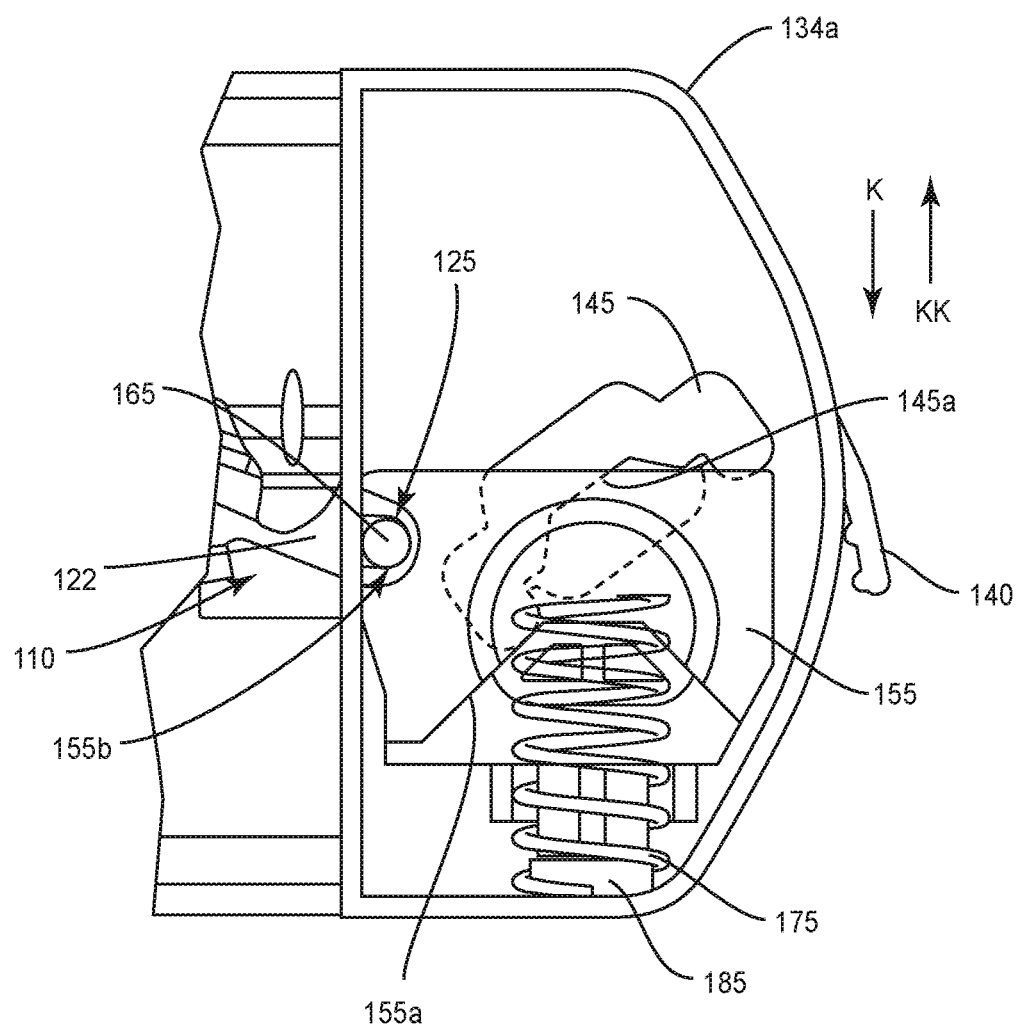
FIG. 8 is a side view, in part phantom, of a portion of the system shown in FIG. 1.

Handle 134 includes a first portion 138 and a second portion 140 that movably engages first portion 138, as shown in FIGS. 3-5 and 9, for example. In some embodiments, first and second portions 138, 140 are positioned between end caps 134a of handle 134. End caps 134a and first portion 138 are fixed relative to wall 90. Second portion 140 includes third locking element 136. Third locking element 136 includes a cam 145 and a sliding block 155 that is movable relative to cam 145, as shown in FIGS. 6-8. In some embodiments, sliding block 155 includes one or a plurality of grooves that mate align with ribs on one of end caps 134a to guide sliding block 155 as it moves within handle 134. In some embodiments, sliding block 155 includes two grooves that each have one of the ribs of one of end caps 134a positioned therein.

Figure 9:
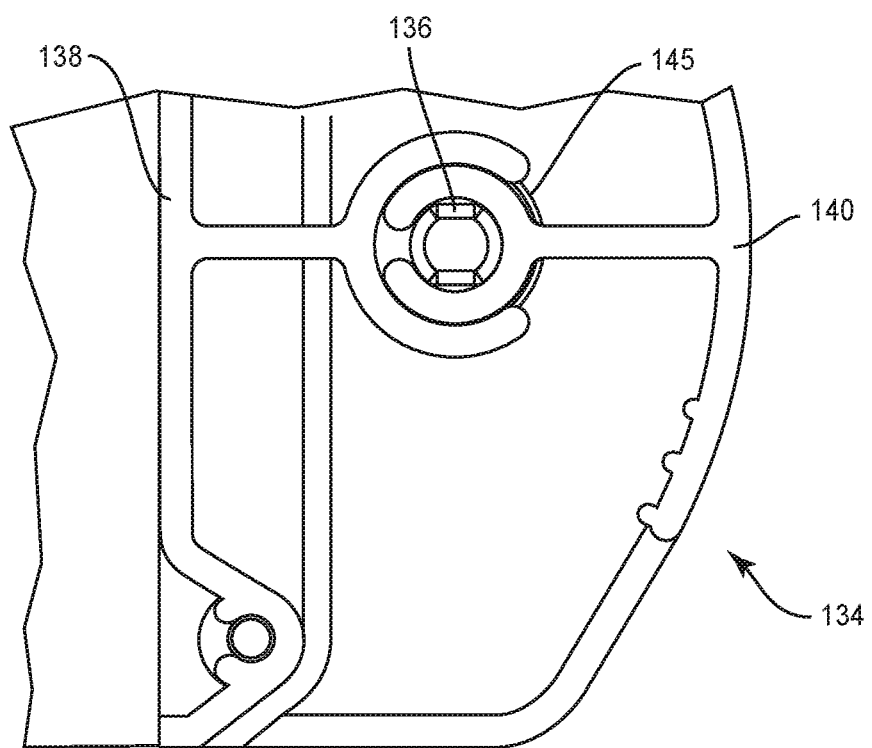
FIG. 9 is a side, cross sectional view of a portion of the system shown in FIG. 1.

Second portion 140 is fixed to cam 145 such that moving second portion 140 also moves cam 145. That is, moving second portion 140 relative to first portion 138 downwardly or in a downward direction, such as, for example, direction K in FIGS. 11 and 12 rotates cam 145 about an axis defined by handle 134 in a clockwise direction, as shown in FIG. 7 and moving second portion 140 relative to first portion 138 upwardly or in an upward direction, such as, for example, the direction KK shown in FIGS. 11 and 12 rotates cam 145 about the axis defined by handle 134 in a counterclockwise direction, as shown in FIG. 8. In some embodiments, second portion 140 is integrally formed with cam 145 such that second portion and cam 145 are monolithic. In some embodiments, second portion 140 includes a clip, such as, for example, a C-clip that snaps onto or otherwise engages a shaft of cam 145, as shown in FIG. 9, to fix second portion 140 relative to cam 145 such that second portion 140 is fixed relative to cam 145. In some embodiments, the shaft of cam 145 and/or the C-clip of second portion 140 have a non-circular cross sectional configuration to prevent rotation of second portion 140 relative to cam 145, or vice versa.

In some embodiments, cam 145 is positioned within sliding block 155 such that a bottom surface 145a of cam 145 engages a ramped surface 155a of sliding block 155. Sliding block 155 engages first locking element 110. In some embodiments, opening 125 of first locking element is aligned with a slot, such as, for example, an opening 155b of sliding block 155 and a pin, such as, for example, pin 165 is positioned through openings 125, 155b to couple first locking element 110 to sliding block 155 such that moving sliding block 155 also moves first locking element 100, as discussed herein. That is moving sliding block 155 in direction K or direction KK, will cause first end 122 of first locking element 110 to move in direction K or direction KK, respectively.

Figure 4:
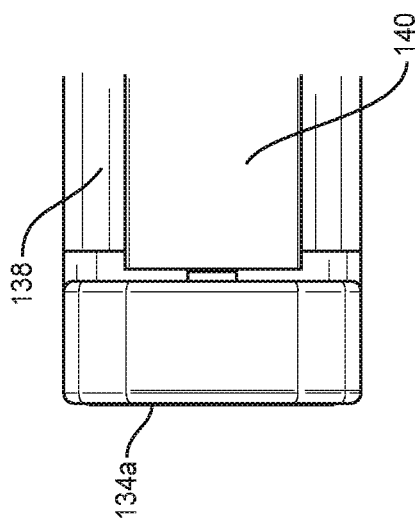
FIG. 4 is a close up, front view of a portion of the component shown in FIG. 3.

Sliding block 155 is biased by a spring, such as, for example, a coiled compression spring 175 to engage cam 145 in a first position, as shown in FIG. 6. When locking elements 110, 112, 136 are in a first configuration, sliding block 155 engages cam 145 in the first position, second portion 140 extends parallel to wall 90, as shown in FIGS. 4 and 5, and flange 116 of guide member 74 is positioned within a cavity 112a of second locking element 112 to prevent movement of rail 96 within third channel 86 of guide member 74 such that container 88 is provisionally fixed to guide member 74. When container 88 is provisionally fixed to guide member 74 container 88 is in a first orientation. Spring 175 biases locking elements 110, 112, 136 into the first configuration. That is, unless second portion 140 is moved relative to first portion to move third locking element 136 to apply a force to spring 175 to overcome the bias of spring 175, locking elements 110, 112, 136 will remain in the first configuration and container 88 will be provisionally fixed relative to guide member 74. In some embodiments, spring 175 is coupled to a post 185 within handle 134. Spring 175 is positioned about post 185 to prevent spring 175 from moving off of post 185.

Locking elements 110, 112, 136 are moved from the first configuration to a second configuration by moving second portion 140 relative to first portion 138 in direction K, as shown in FIG. 7, or in direction KK, as shown in FIG. 8. Moving second portion 140 relative to first portion 138 in direction K rotates cam 145 about the axis defined by handle 134 in a clockwise direction such that bottom surface 145a of cam 145 slides along ramped surface 155a of sliding block 155, which moves sliding block 155 in direction K, as shown in FIG. 7. Likewise, moving second portion 140 relative to first portion 138 in direction KK rotates cam 145 about the axis defined by handle 134 in a counterclockwise direction such that bottom surface 145a of cam 145 slides along ramped surface 155a of sliding block 155, which moves sliding block 155 in direction K, as shown in FIG. 8. In some embodiments, moving second portion 140 relative to first portion 138 in direction K and/or direction KK comprises rotating second portion 140 relative to first portion 138 about the axis defined by handle 134.

As discussed above, moving second portion 140 relative to first portion 138 in direction K or direction KK causes cam 145 to rotate relative to sliding block 155 in a manner that moves sliding block 155 in direction K to apply a force to spring 175 to overcome the bias of spring 175. Moving sliding block 155 in direction K causes end 122 of first locking element 110 in direction K such that first locking element 110 pivots about pivot point 126 to move end 124 of first locking element 110 upwardly in direction KK. As end 124 of first locking element 110 moves in direction KK, end 130 of second locking element 122 moves in direction K, thus causing second locking element 122 to pivot about pivot point 132, which moves end 128 of second locking element 112 in direction K. Moving end 128 of second locking element 112 in direction K causes end 128 to disengage flange 116 such that flange 116 moves out of cavity 112a in end 128. After end 128 disengages flange 116, container 88 is able to translate relative to guide member 74. That is, rail 96 can move within third channel 86 along the length of guide member 74. When container 88 is able to translate relative to guide member 74, container 88 is in a second orientation.

Allowing a user to move container 88 from the first orientation to the second orientation by moving second portion 140 relative to first portion 138 in direction K or direction KK provides the user with options to move container 88 from the first orientation to the second orientation. For example, the user can move container 88 from the first orientation to the second orientation by using his or hand to lift second portion 140. Alternatively, the user can push second portion 140 down using his or her hand and/or an item he or she is holding, such as, for example, a package or other item. This may be especially useful when the user does not have a free hand to move container 88 from the first orientation to the second orientation.

In some embodiments, system 20 includes a vehicle 200, such as, for example, a van, truck or car having at least one first side door 202 and at least one second side door 204 opposite first side door 202. It is envisioned that the at least one first side door 202 may include a pair of first side doors 202 that open independently of one another. It is envisioned that vehicle 200 may lack a post or other support means between the pair of first side doors 202 such that an interior of vehicle 200 has an open configuration adjacent the pair of first side doors 202. It is envisioned that the at least one second side door 204 may include a pair of second side doors 204 that open independently of one another. It is envisioned that vehicle 200 may lack a post or other support means between the pair of second side doors 204 such that the interior of vehicle 200 has an open configuration adjacent the pair of second side doors 204. Vehicle 200 includes a partition 206 positioned between the pair of first side doors 202 and the pair of side doors 204. Partition 206 is fixed relative to vehicle 200 and extends substantially parallel to side doors 202, 204 when side doors 202, 204 are in a closed position. That is, partition 206 extends parallel to an axis defined by vehicle 200. It is envisioned that partition 206 may extend from a floor of vehicle 200 to a ceiling of vehicle 200. In some embodiments, partition 206 is removable. In some embodiments, partition 206 integrally formed with the floor and/or ceiling of the vehicle.

Figure 16:
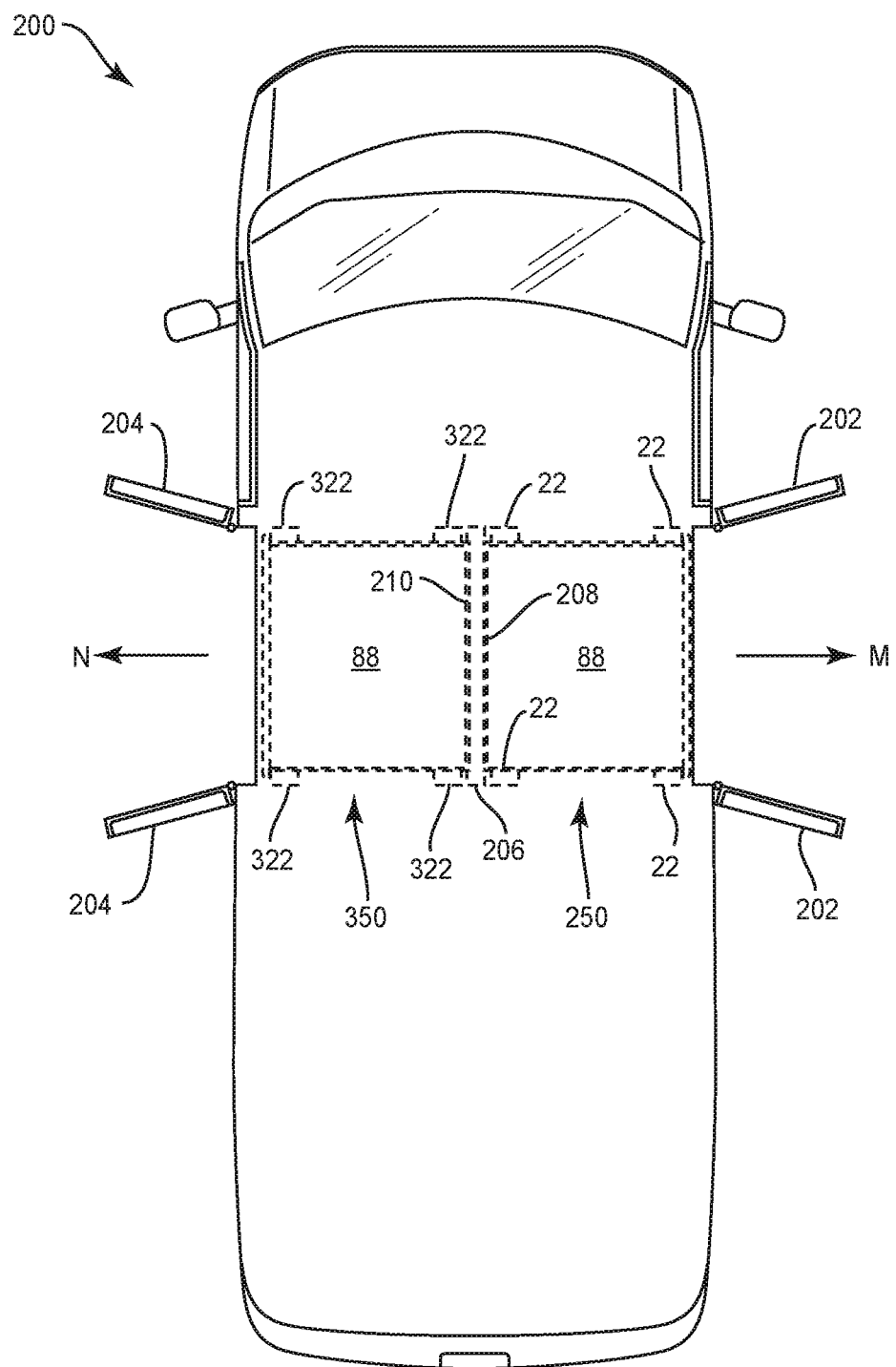
FIG. 16 is a top, cross sectional view of the system shown in FIG. 1 positioned in a vehicle, wherein the vehicle includes a second shelving system in accordance with the principles of the present disclosure, and wherein the system shown in FIG. 1 and the second system have drawers in a closed position.

First and second side members 22, 22 are positioned in the interior of vehicle 200 such that first and second side members 22, 22 extend perpendicular to partition 206. One of first and second side members 22, 22 engages a first surface 208 of partition 206. Slides 42, cross members 68, guide members 74, containers 88, upper members 100 and lower members 108 are positioned relative to side members 22 and/or one another in the manner discussed herein to define a first shelving unit 250, as best shown in FIGS. 16 and 17.

In some embodiments, system 20 includes a second shelving unit 350 comprising third and fourth side members 322 each having a configuration similar to side members 22, 22. Third and fourth side members 322, 322 include an inner surface defining a fourth channel. Third and fourth side members 322, 322 are being positioned in the interior of vehicle 200 such that third and fourth side members 322, 322 extend perpendicular to partition 206. One of third and fourth side members 322, 322 engage a second surface 210 of partition 206 that is opposite first surface 208. A second slide 42 is movably disposed in each fourth channel of third and fourth side members 322, 322. The fourth channels each have a configuration similar to first channels 30. A second cross member 68 extends between and connects the second slides 42. A second guide member 74 is movably disposed in second channel 72 of second cross member 68. A rail 96 of a second container 88 is movably disposed in third channel 86 of second cross member 68.

Figure 17:
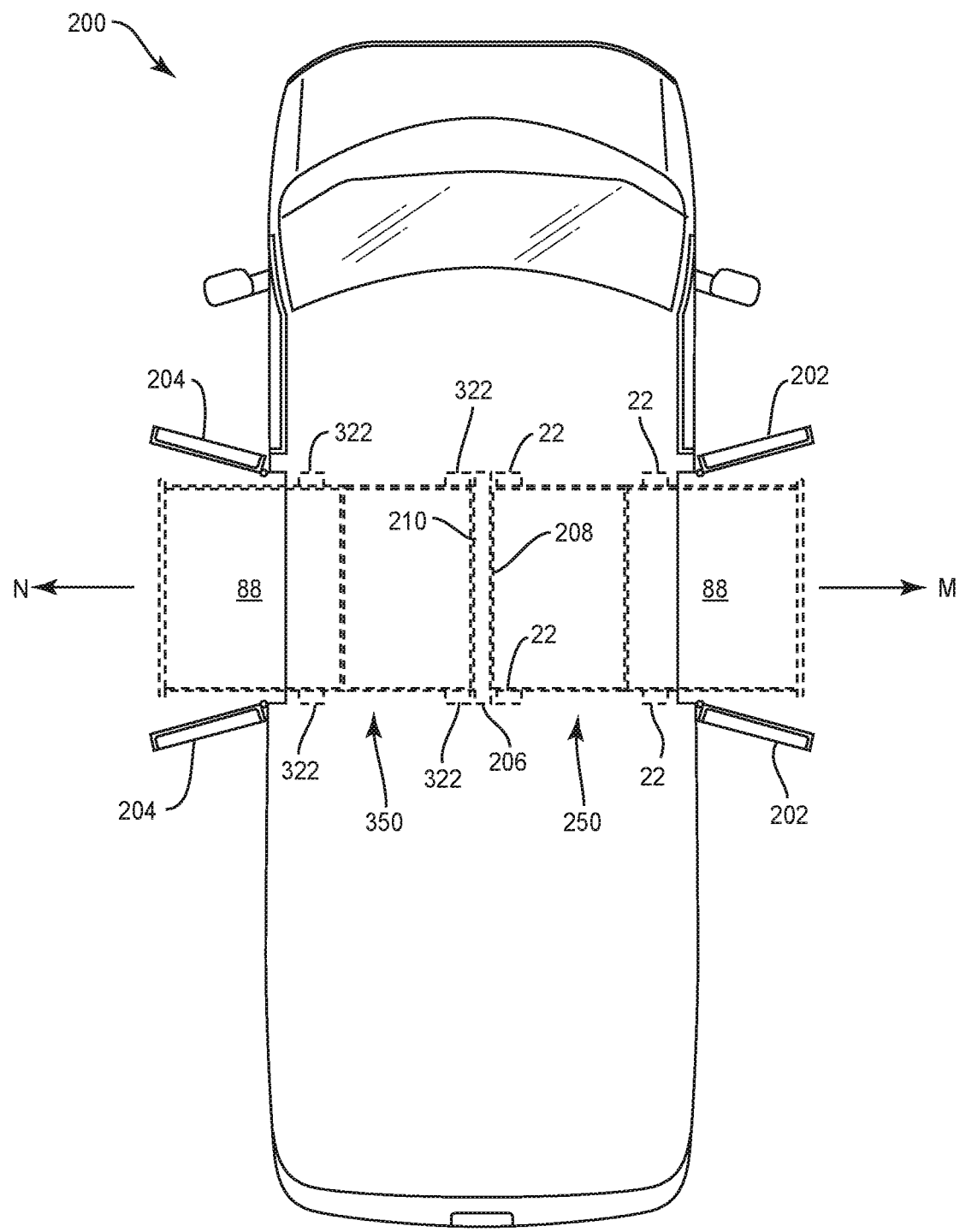
FIG. 17 is a top, cross sectional view of the system shown in FIG. 1 and the second system shown in FIG. 16 positioned in a vehicle, wherein the system shown in FIG. 1 and the second system shown in FIG. 16 have drawers in an open position.

Container 88 of first shelving unit 250 and second container 88 of second shelving unit 350 open in opposing directions, as best shown in FIG. 17. That is, container 88 opens by moving container 88 relative to vehicle 200 in the direction shown by arrow M and closes by moving container 88 relative to vehicle 200 in the direction shown by arrow N. Conversely, container 388 opens by moving container 388 relative to vehicle 200 in the direction shown by arrow N and closes by moving container 388 relative to vehicle 200 in the direction shown by arrow M.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A release comprising:
a rail comprising a flange; and
a frame coupled to the rail, the frame including a first locking element;
a handle coupled to the frame, the handle including a second locking element,
wherein the second locking element is configured to rotate relative to the frame such that rotation of the second locking element rotates the first locking element relative to the flange to move the release from a first orientation in which the first locking member engages the flange and the frame is prevented from sliding relative to rail and a second orientation in which the first locking member is spaced apart from the flange and the frame is slidable relative to the rail,
wherein the second locking element includes a sliding block.

2. The release recited in claim 1, wherein the rail is a guide member.

3. The release recited in claim 1, wherein the release is biased to the first orientation by a spring.

4. The release recited in claim 1, wherein the release is biased to the first orientation by a spring that engages the second locking element.

5. The release recited in claim 1, further comprising a shelf, the frame being coupled to the shelf, the shelf having a side member, the rail being coupled to the side member such that the rail extends perpendicular to the side member, the rail being movable relative to the side member.

6. The release recited in claim 5, wherein release is biased to the first orientation by a spring that engages the second locking element.

7. The release recited in claim 1, wherein the flange extends inwardly from an inner surface of the rail such that the flange extends at an acute angle relative to the rail.

8. The release recited in claim 1, wherein the rail extends along a longitudinal axis between opposite ends of the rail, the flange extending at an acute angle relative to the longitudinal axis.

9. A release comprising:
a rail comprising a flange; and
a frame coupled to the rail, the frame including a first locking element;
a handle coupled to the frame, the handle including a second locking element,
wherein the second locking element is configured to rotate relative to the frame such that rotation of the second locking element rotates the first locking element relative to the flange to move the release from a first orientation in which the first locking member directly engages the flange and the frame is prevented from sliding relative to rail and a second orientation in which the first locking member is spaced apart from the flange and the frame is slidable relative to the rail, and
wherein the second locking element includes a sliding block.

10. The release recited in claim 9, wherein the release is biased to the first orientation by a spring.

11. The release recited in claim 9, wherein the release is biased to the first orientation by a spring that engages the second locking element.

12. The release recited in claim 9, further comprising a shelf, the frame being coupled to the shelf, the shelf including a side member, the rail being coupled to the side member such that the rail extends perpendicular to the side member, the rail being movable relative to the side member.

13. The release recited in claim 12, wherein release is biased to the first orientation by a spring that engages the second locking element.

14. The release recited in claim 9, wherein the flange extends inwardly from an inner surface of the rail such that the flange extends at an acute angle relative to the rail.

15. The release recited in claim 9, wherein the rail extends along a longitudinal axis between opposite ends of the rail, the flange extending at an acute angle relative to the longitudinal axis.

16. A release comprising:
a rail comprising a flange; and
a frame coupled to the rail, the frame including a first locking element;
a handle coupled to the frame, the handle including a second locking element,
wherein the second locking element is configured to rotate relative to the frame such that rotation of the second locking element rotates the first locking element relative to the flange to move the release from a first orientation in which the first locking member engages the flange and the frame is prevented from sliding relative to rail and a second orientation in which the first locking member is spaced apart from the flange and the frame is slidable relative to the rail,
wherein the second locking element includes a cam that rotates about an axis defined by the handle to move the release between the orientations, wherein the second locking element includes a sliding block, and wherein the release is biased to the second orientation by a spring that engages the second locking element.

\* \* \* \* \*